US005637658A

United States Patent [19]
Teodorczyk

[11] Patent Number: 5,637,658
[45] Date of Patent: Jun. 10, 1997

[54] MODIFIED PHENOL-ALDEHYDE RESIN AND BINDER SYSTEM

[75] Inventor: Zygmunt Teodorczyk, Batavia, Ill.

[73] Assignee: Masonite Corporation, Chicago, Ill.

[21] Appl. No.: 447,839

[22] Filed: May 23, 1995

Related U.S. Application Data

[63] Continuation of Ser. No. 107,522, Aug. 17, 1993, abandoned.

[51] Int. Cl.$^6$ .................... C08F 283/00; C08G 8/28; C08L 61/06
[52] U.S. Cl. .................... 525/480; 528/129; 528/142; 528/147; 528/155; 528/162; 528/232; 528/503; 525/504; 525/534; 428/524; 428/528
[58] Field of Search .................... 528/129, 142, 528/147, 155, 162, 232, 503; 525/480, 504, 534; 428/524, 528

[56] References Cited

U.S. PATENT DOCUMENTS

| | | | |
|---|---|---|---|
| Re. 26,881 | 5/1970 | Kreibich et al. | 312/219 |
| 2,471,631 | 5/1949 | Lebach | 260/43 |
| 2,489,336 | 11/1949 | Spahr et al. | 528/155 |
| 2,614,096 | 10/1952 | Spahr | 526/59 |
| 3,328,354 | 6/1967 | Dietrick | 526/59 |
| 3,389,125 | 6/1968 | Dietrick et al. | 528/140 |
| 3,422,068 | 1/1969 | Kreibich et al. | 260/52 |
| 3,476,706 | 11/1969 | Bornstein | 260/54 |
| 3,492,263 | 1/1970 | Kreibich et al. | 524/541 |
| 3,502,610 | 3/1970 | Thompson | 260/38 |
| 3,663,720 | 5/1972 | Thompson | 117/70 R |
| 3,706,619 | 12/1972 | Freeman | 156/315 |
| 3,919,151 | 11/1975 | Moult et al. | 524/594 |
| 3,963,652 | 6/1976 | Tanimura et al. | 260/3 |
| 3,982,537 | 9/1976 | Bucalo | 128/260 |
| 4,007,233 | 2/1977 | Kako et al. | 260/845 |
| 4,030,499 | 6/1977 | Bucalo | 128/260 |
| 4,053,447 | 10/1977 | Shea | 260/38 |
| 4,054,138 | 10/1977 | Bucalo | 128/60 |
| 4,076,873 | 2/1978 | Shea | 428/35 |
| 4,107,127 | 8/1978 | Shea | 260/38 |
| 4,167,540 | 9/1979 | Giller et al. | 525/135 |
| 4,190,720 | 2/1980 | Shalaby | 528/354 |
| 4,238,379 | 12/1980 | Reinhart, Jr. | 260/29.3 |
| 4,275,170 | 6/1981 | McAllister et al. | 521/103 |
| 4,309,527 | 1/1982 | McAllister et al. | 528/138 |
| 4,373,062 | 2/1983 | Brown | 524/841 |
| 4,403,066 | 9/1983 | Brode et al. | 524/876 |
| 4,409,361 | 10/1983 | McAllister et al. | 524/876 |
| 4,425,178 | 1/1984 | Grendon | 156/307.3 |
| 4,430,473 | 2/1984 | Brode et al. | 524/492 |
| 4,433,119 | 2/1984 | Brode et al. | 525/442 |
| 4,433,129 | 2/1984 | Brode et al. | 528/154 |
| 4,471,089 | 9/1984 | McAllister et al. | 524/847 |
| 4,514,462 | 4/1985 | Brooker | 428/285 |
| 4,608,408 | 8/1986 | Hood et al. | 524/15 |
| 4,791,929 | 12/1988 | Jarrett et al. | 128/335.5 |
| 4,820,576 | 4/1989 | Duryea | 428/246 |
| 4,853,225 | 8/1989 | Wahlib et al. | 424/423 |
| 4,889,891 | 12/1989 | Durairaj et al. | 525/139 |
| 4,938,763 | 7/1990 | Dunn et al. | 604/891.1 |
| 5,030,457 | 7/1991 | Ng et al. | 424/486 |
| 5,034,497 | 7/1991 | Waitkus | 528/129 |
| 5,075,413 | 12/1991 | Dailey, Jr. | 528/129 |
| 5,100,433 | 3/1992 | Bezwada et al. | 606/230 |
| 5,160,737 | 11/1992 | Friedman et al. | 424/401 |

FOREIGN PATENT DOCUMENTS

| | | |
|---|---|---|
| 0 298 704 | 1/1989 | European Pat. Off. |
| 456816 | 2/1975 | U.S.S.R. |
| 483419 | 4/1976 | U.S.S.R. |
| 516704 | 10/1977 | U.S.S.R. |
| 1470750 | 4/1989 | U.S.S.R. |
| 1 295 829 | 11/1972 | United Kingdom. |
| 1 496 703 | 12/1977 | United Kingdom. |
| 2040971 | 9/1980 | United Kingdom. |
| 1593933 | 7/1981 | United Kingdom. |
| 2100274 | 12/1982 | United Kingdom. |

OTHER PUBLICATIONS

A. Pizzi, "Phenolic Resin Wood Adhesives", pp. 160–173.
Hawley's Condensed Chemical Dictionary, Eleventh Edition, 1987, pp. 536–537 and 914–915.
A. Pizzi, *Wood Adhesives*, "Phenolic Resin Wood Adhesives," p. 140.

*Primary Examiner*—Samuel A. Acquah
*Attorney, Agent, or Firm*—Marshall, O'Toole, Gerstein, Murray & Borun

[57] ABSTRACT

A process for the production of a modified phenol-aldehyde resin which may form a binder system when combined with a curing agent which includes an additional source of an aldehyde, e.g., a phenol-formaldehyde resin. The inventive phenol-aldehyde resin may be modified with compounds from one of the following classes: (1) dihydroxybenzenes, (2) arninophenols, and (3) phenylenediamines. The resin and adhesive are useful in the production of a wood composite (such as plywood, oriented strandboard, or fiberboard).

13 Claims, No Drawings

MODIFIED PHENOL-ALDEHYDE RESIN AND BINDER SYSTEM

This is a file wrapper continuation of U.S. application Ser. No. 08/107,522 filed Aug. 17, 1993, now abandoned.

BACKGROUND OF THE INVENTION

1. Field of the Invention

The invention relates generally to the production of a modified phenol-aldehyde resin, and more particularly to the preparation and use of a modified phenol-aldehyde resin which utilizes an additional source of aldehyde, e.g., a phenol-formaldehyde resin, as a curing agent. The invention further relates to the use of such a cured resin as a binder in a process for the production of wood composites, e.g., plywood or fiberboard.

2. Description of Related Technology

Various processes may be used to produce wood composites depending on the desired final product which is desired. Synthetic resins, such as phenol-formaldehyde resins, are often used as binders in the manufacture of wood composites such as man-made pressed wood boards (e.g., waferboard, oriented strandboard ("OSB"), or fiberboard). Such wood composites may be formed in desired shapes and sizes depending on the intended use. Fiberboard, for example, may be made by various known processes including "dry" processes (e.g., a process comprising application of resin by a blender or by a blow line application), "wet" processes, or "wet-dry" processes. Various known phenol-formaldehyde resins may also be utilized as binders in the manufacture of other wood composites such as plywood.

Several useful processes are described (for example, for the production of plywood and fiberboard) in U.S. Pat. No. 4,961,795, the disclosure of which is incorporated herein by reference.

Various fast-curing phenol-formaldehyde resins have been utilized as binders in the manufacture of wood composites. Typical fast curing phenol-formaldehyde resins have (a) a high molar ratio of formaldehyde to phenol and (b) a high caustic content in order to accelerate the curing process. However, such fast-curing resins are undesirable due to (a) high levels of free formaldehyde emission during pressing and (b) the high caustic content which negatively impacts the resistance of the final product to moisture.

It is therefore desirable to produce a binder resin which (a) has a relatively fast cure time and/or (b) is resistant to high levels of moisture. In addition, it is desirable to produce a binder system in which undesirable amounts of formaldehyde will not be released into the atmosphere upon pressing. It is further desirable to produce a binder system which is convenient to use in a process such as the those described above.

SUMMARY OF THE INVENTION

It is an object of the invention to overcome one or more of the problems described above.

Accordingly, the invention provides a process for producing a modified phenol-aldehyde resin (e.g., a phenol-formaldehyde resin) useful in the production of wood composites, e.g., waferboard. The resin is preferably modified with a compound from one of the following classes: (1) dihydroxybenzenes, (2) aminophenols, and (3) phenylenediamines, including combinations thereof.

According to one feature of the invention, the inventive modified phenol-aldehyde resin is combined with a source of aldehyde (e.g., formaldehyde or a formaldehyde derivative) to form a binder system. In a preferred embodiment of the invention, a binder system is provided by supplying the modified phenol-aldehyde resin in combination with a curing agent which is an organic resin comprising formaldehyde.

In a further embodiment of the invention, the modified phenol-aldehyde resin is combined with a curing agent and cellulosic material (e.g., wood wafers) to form a mat. The mat is cured under heat and pressure to form a wood composite. Alternatively, the inventive resin may be combined with a curing agent and utilized as a binder in the manufacture of plywood.

Other objects and advantages of the invention will be apparent to those skilled in the art from the following detailed description, taken in conjunction with the appended claims.

DETAILED DESCRIPTION OF A PREFERRED EMBODIMENT

According to the invention, a modified phenol-aldehyde resin is produced by first condensing phenol and an aldehyde in the presence of an alkaline catalyst. The condensation product of phenol and the aldehyde is then further condensed with a modifier selected from one of the following (1) dihydroxybenzenes, (2) aminophenols, and (3) phenylenediamines. The resin may be incorporated with a curing agent (e.g., a phenol-formaldehyde resin) which provides a further source of aldehyde. The combination of the inventive resin and curing agent may comprise a binder system which is preferably blended with a cellulosic material (e.g., wood wafers or fibers) and formed into a wood composite, e.g. waferboard, fiberboard, or particleboard.

According to a preferred embodiment of the inventive process, formaldehyde (or a formaldehyde derivative or other aldehyde) and phenol (or a phenol derivative) are condensed, preferably at a temperature of about 65°–70° C. in a reactor in the presence of an alkaline catalyst (e.g., caustic) to achieve methylolation of phenol. Useful catalysts include those known in the art, for example, sodium hydroxide or potassium hydroxide. The reference herein to "phenol" denotes phenol derivatives, as well as phenol itself (i.e., hydroxybenzene). Derivatives of phenol include, for example, substituted phenols. Thus, the reference herein to "formaldehyde" does not limit the invention to formaldehyde, but denotes derivatives of formaldehyde, as well as formaldehyde itself, other aldehydes and derivatives of other aldehydes. Derivatives of formaldehyde include, for example, paraformaldehyde and hexamethylenetetramine. The ratio of aldehyde to phenol is preferably in the range of about 1.2 to about 2.0 moles aldehyde per mole phenol, more preferably about 1.3 to about 1.6 moles aldehyde per mole phenol, and most preferably about 1.4 moles aldehyde per mole phenol.

Although higher levels of caustic may be utilized (especially for plywood applications), caustic is preferably added to the reaction mixture at about 0.1 to about 0.2 moles sodium hydroxide per mole of phenol. Such an amount of caustic preferably assures very beneficial wet properties of wood composites (e.g., tolerance to moisture), while allowing for sufficiently rapid cure. More caustic can be used to accelerate the resin cure process; however, a high caustic content may result in undesirable properties in the final product, including higher water absorption rates and thickness swell of the final wood composite product.

Following the condensation reaction between phenol and an aldehyde, the reactor is preferably heated to about 90° C.

and held at this temperature to obtain a polymer of desired chain length. The desired chain length of the polymer, which varies depending upon the reactants and reaction conditions, will generally be based on a measurement of the viscosity of the initial condensation product, which may be referred to as a "PF pre-polymer."

An amount of a modifier (e.g., resorcinol) is added to this initial condensation product, preferably without the addition of further caustic, followed by continuation of the reaction until a desired chain length (e.g., a desired viscosity) is reached to produce what may be referred to as a "PRF pre-polymer" or "PRF resin." The inventive resin is also referred to herein as a modified phenol-formaldehyde resin. The compounds which may be reacted with the phenol-formaldehyde pre-polymer include three classes of compounds: (1) dihydroxybenzenes, (2) aminophenols, and (3) phenylenediamines. Examples of dihydroxybenzenes include resorcinol, hydroquinone, and catechol. Examples of aminophenols include ortho-hydroxyaniline, meta-hydroxyaniline, and para-hydroxyaniline. Examples of phenylenediamines include ortho-phenylenediamine, meta-phenylenediamine, and para-phenylenediamine. When resorcinol is referred to herein (e.g., in the examples or preferred ratios described below), any compound in these three classes may be utilized as an alternative to resorcinol, including combinations thereof. Thus, when the term "PRF resin" or "PRF pre-polymer" is used herein, this refers not only to a resin or pre-polymer including resorcinol, but includes any of the compounds described above. Resorcinol, however, is the preferred compound.

The above-described sequential condensation reactions preferably use a molar ratio of phenol to resorcinol of about 1 to about 10 moles phenol per mole resorcinol, and more preferably about 5 to about 10 moles phenol per mole resorcinol. The ratio of formaldehyde to total phenolic compounds (i.e., phenol plus resorcinol) is preferably about 1 to about 1.8 moles formaldehyde per mole phenolics, more preferably about 1.1 to about 1.4 moles formaldehyde per mole phenolics, and most preferably about 1.2 moles formaldehyde per mole phenolics (i.e., the molar ratio of formaldehyde to phenol plus resorcinol may be greater than 1).

Following the condensation of resorcinol (or one of the other suitable compounds described above), the reactor is cooled to ambient temperature for storage. The product resin, which may be referred to as a "PRF resin," is generally stable at ambient temperature for at least one month. The inventive PRF resin is preferably utilized in conjunction with a curing agent (described below) as a binder system in the manufacture, for example, of waferboard, fiberboard (e.g., medium density fiberboard or hardboard), oriented strandboard, plywood, and particleboard. In the binder system, the inventive resin exhibits very fast cure and excellent tolerance to high levels of moisture.

As stated above, the formaldehyde component of the inventive resin is not limited to formaldehyde itself, but encompasses any formaldehyde derivative and other aldehydes or derivatives thereof which are known in the art to be useful in conjunction with phenol-formaldehyde resins. For example, the following aldehydes are useful as the formaldehyde component of the invention: acetaldehyde, glyoxal, and furaldehyde. However, formaldehyde is the preferred aldehyde. Thus, it is understood that when the formaldehyde component of the resin is referred to herein, this refers to formaldehyde, formaldehyde derivatives, and other aldehydes.

In addition, although phenol itself is preferably utilized in order to produce a resin which can be made economically on a commercial scale, many other compounds are useful as the phenol or phenol derivative of the present invention. Such useful phenols include substituted phenols such as cresols and xylenols. Therefore, it is also understood that when the phenol component of the resin is referred to herein, this refers to both phenol itself and phenol derivatives.

As is known in the art, a variety of modifiers may be incorporated into the phenol-resorcinol-formaldehyde resin in order to modify its properties. These modifiers include, for example: urea, melamine, lignins, tannins, sugars, starches, glycols, polyols, and mixtures thereof. The proportion of modifier incorporated into the resin typically ranges from about 5 to about 35 weight percent based upon the phenolic component.

The inventive PRF resin produced by the above-described process may be satisfactorily utilized in any process that utilizes a conventional hot press. For example, the inventive PRF resin preferably is able to be cured while using an additional source of aldehyde in press cycles not longer than those typically observed for isocyanate resins, while at the same time the inventive resin yields a substrate with better weatherability properties.

Although the resin may be cured by itself at high temperatures, the cure rate of the resin is preferably accelerated by addition to the PRF resin of a source of further formaldehyde or other aldehyde. The PRF resin and the source of further formaldehyde may be applied as a two-component binder system. However, it must be emphasized that the PRF resin in combination with a PF resin (as a curing agent) can be easily spray-dried by a process known in the art and used as a one-component system. Any source of formaldehyde or other aldehyde may be used to accelerate the cure of the PRF resin.

According to a preferred embodiment of the invention, an organic resin comprising formaldehyde (e.g., a fast-curing phenol-formaldehyde resin or a "PF resin") is utilized as the curing agent. Any organic resin comprising formaldehyde, a formaldehyde derivative, or other aldehydes may be utilized. Thus, when a phenol-formaldehyde resin is referred to herein, reference is also made to the other resins described in the preceding sentence. However, a phenol-formaldehyde resin is the preferred curing agent. When using a PF resin as the curing agent, the weight proportion of the PRF resin to PF resin is preferably about 0.25:1 to about 4:1, and more preferably about 0.6:1 to about 1.5:1. PF resins known in the art as binders in wood composites may be suitably utilized as the source of further formaldehyde. For example, a PF resin having a molar ratio of formaldehyde to phenol of about 2 to about 3 moles formaldehyde per mole phenol, and more preferably about 2.4 moles formaldehyde per mole phenol is useful with the invention. Where the source of further formaldehyde is a phenol-formaldehyde resin, the total resulting ratio of phenol to resorcinol (in the complete binder system) is preferably at least about 10 moles phenol per mole resorcinol. In addition, the total molar ratio of formaldehyde to phenol in the complete binder system may be about 1.8 moles formaldehyde per mole phenol.

The use of the above-described resins as curing agents, e.g., a phenol-formaldehyde resin, is beneficial not only because the PF resin functions as a curing agent, but because the PF resin contributes on its own as a binding agent. Because the PF resin is a binding agent, this provides a further advantage in that the PF resin preferably reduces the overall cost of the binder system due to the lower cost of phenol-formaldehyde resins.

In addition to phenol-formaldehyde resins, urea-formaldehyde or melamineoformaldehyde resins may be utilized as curing agents with the invention. Alternatively (although less preferably), the curing agent may be hexamethylenetetramine or paraformaldehyde. Further, combinations of any of the above-described curing agents may also be utilized.

An example of a preferred embodiment of the invention will now be described in conjunction with the production of a waferboard product. It is understood, however, that the inventive resin and binder system may be utilized in other processes, for example, in the manufacturing of plywood. According to the example, phenol, formaldehyde and water are first combined in a reaction vessel. The ingredients are mixed, followed by the addition of caustic to the mixture, preferably at a temperature below about 45° C., to begin the condensation reaction. Because the reaction is generally highly exothermic, caustic is added slowly, preferably of over a period of time of, for example, about fifteen minutes.

The temperature of the reactants is allowed to increase stepwise until the temperature reaches about 65° C. The reaction is preferably paused at previously determined increments, for example at 50° C., 55° C., and 60° C. The temperature of the reaction is then preferably held at about 65° C. for about thirty minutes. An additional amount of caustic is may next be added, preferably at a temperature below 70° C., for example. The reaction temperature is now allowed to increase to about 85° C.; the reaction mixture is heated, if necessary, to reach this temperature.

The reaction mixture is held at this temperature (about 85° C.) until the mixture reaches a viscosity of about "B"–"C", as defined by the Gardner viscosity scale. When the reaction mixture attains this viscosity, resorcinol is added to the reactor, which is held at about 85° C. until the reactants attain the viscosity of about "E"–"F." Once the reaction mixture has reached this viscosity, the batch is cooled as fast as possible to about 25° C. The reaction mixture need not be cooled prior to the addition of the modifier, e.g., resorcinol; such cooling is necessary in many prior art processes, for example, those processes disclosed in U.S. Pat. Nos. 2,489,336 and 2,614,096. The resin is now suitable for pumping to storage.

The PRF resin may be stored as an aqueous liquid. If the resin is to be stored as an aqueous liquid, the resin is preferably not mixed with the phenol-formaldehyde curing agent until immediately prior to use in the manufacturing process, because such a mixture is not stable and might result in undesirable curing of the resin. However, if the resin is to be stored as a powder, the resin can be mixed with the phenol-formaldehyde curing agent immediately prior to the spray-drying (wherein the liquid form of the resin is made into a powder form). Although not necessary, both liquids (PRF and PF) may be mixed in-line immediately prior to blending with the cellulosic material, or to spray-drier. They may be also mixed in a separate tank before spray-drying or addition to cellulosic material. Such liquid mixture of PRF and PF curing resin is stable for several hours.

A particular preferred resin formulation which may be used in the preceding example is shown in Table I below. In Table I, the two amounts of caustic soda reflect the above-described stepwise addition of caustic soda. It is understood, however, that many other variations of the inventive procedure are possible.

TABLE I

| Reactant | Weight Percent (based on Total Ingredients) | Concentration of Solution |
| --- | --- | --- |
| Phenol | 34.22 | Pure |
| Formaldehyde | 41.26 | 37 wt. % |
| Water | 12.15 | — |
| Caustic soda | 2.18 | 50 wt. % |
| Caustic soda | 2.18 | 50 wt. % |
| Resorcinol | 8.01 | 98 wt. % |
| Total | 100.00 | |

A resin produced in accordance with the example described above preferably has the properties outlined in Table II.

TABLE II

| Property | Value |
| --- | --- |
| Non-volatiles | 49.0–51.0 wt. % |
| Viscosity | 75–150 cps |
| Water Tolerance | 250–400 wt. % |
| Gel Time @ 100° C. | >60 min. |
| Spec. Grav. @20° C. | about 1.15 g/mL |
| Free Formaldehyde | <0.1 wt. % |

The resin produced by the above process may be used as a binder in the production of waferboard such as that described above. In one embodiment of the invention, in the production of waferboard, a liquid form of the resin is added along with a liquid form of a phenol-formaldehyde resin curing agent to wood flakes or wafers in a mixing vessel, followed by mechanical blending of the ingredients. Alternatively, the powder form of this two-component binder system may be added to the wood wafers as a one-component resin. The wood wafers may, for example, have a moisture content of less than about 20 wt.%. Optionally, other materials such as waxes (to improve water resistance and for sizing properties) may be added to the waferboard, as is known in the art.

The mixed ingredients are formed into a mat and then cured under heat and pressure to form 5 waferboard. As will be apparent to one of ordinary skill in the art, desirable pressing temperatures vary according to various factors, including the following: the thickness of the board, the type of cellulosic material being pressed, the moisture content of the cellulosic material, the press time, and the type of resin which is utilized. However, for most applications, the press temperature is generally between about 200° F. and 500° F., and preferably greater than 300° F. For the production of waferboard as in the above example, the press temperature is preferably greater than 400° F.

The moisture content of the cellulosic material (known as "furnish moisture content") is one factor which controls the core temperature of the mat which can be achieved under given press conditions. Because the inventive resin system is very fast curing, one resulting advantage is that the binder system is able to be cured at lower core temperatures than fast curing phenol-formaldehyde resins at a given furnish moisture content, or at a furnish higher moisture content at a given press temperature.

After the wood composite has been pressed, it may be immediately transported for coating, gluing, staining, or other finishing to complete a desired product for commercial use.

Boiling Water Gel Time ("BWGT"), which can be used as an indicator of resin activity, helps illustrate the effectiveness of the inventive binder system. A higher BWGT indicates a lower reactivity. A PRF resin prepared in accordance with the above formulation generally has a BWGT of above 60 minutes. In comparison, a fast curing phenol-formaldehyde resin used as the curing agent for the inventive PRF resin has a BWGT of about 23 minutes. However, when used in combination (i.e., where the PF resin is the curing agent for the PRF resin), at a weight ratio of about 1:1, the inventive binder system has a BWGT of about 13 to about 14 minutes.

Further, as can be seen from Table III below, the internal bond strength values of the wood composite (tested according to ASTM standards and expressed in psi) are significantly better where the binder is the inventive PRF/PF system than where a fast-curing PF itself is the binder, for given cure times. (The furnish moisture content of the cellulosic material was about 9 percent and boards made with each type of resin were produced under the same conditions.) Table III also lists the average, standard deviation, minimum value, and maximum value for each tested resin.

TABLE III

Internal Bond Strength (psi) - 180 Second Cook Time

|  | PF Resin | PRF with PF |
|---|---|---|
|  | 100 | 90 |
|  | 70 | 114 |
|  | 55 | 88 |
|  | 63 | 60 |
|  | 65 | 75 |
|  | 68 | 121 |
|  | 80 | 123 |
|  | 73 | 121 |
|  | 93 | 73 |
|  | 71 | 77 |
|  | 52 | 73 |
|  | 53 | 108 |
|  | 65 | 100 |
|  | 65 | 106 |
|  | 60 | 84 |
|  | 54 | 98 |
|  | 58 | 73 |
|  | 75 | 111 |
|  | 70 | 99 |
|  | 55 | 86 |
|  | 65 | 79 |
|  | 55 | 94 |
|  | 71 | 74 |
|  | 38 | 52 |
|  | 75 | 78 |
|  | 88 | 110 |
|  | 55 | 88 |
|  | 35 | 100 |
|  | 80 | 89 |
|  | 70 | 93 |
|  | 81 | 68 |
|  | 78 | 125 |
| AVG | 66.8 | 91.6 |
| STD. DEV. | 14.0 | 18.7 |
| MIN | 35 | 52 |
| MAX | 100 | 125 |

It was also found that other properties (such as water absorption, thickness swell, one hour boil caliper swell) are much better for the inventive binder system, even at the shorter press times, than for known phenol-formaldehyde resins. The water absorption and thickness swell tests are performed by soaking a board for twenty-four hours at room temperature. In the one hour board caliper swell test, the boards are boiled for one hour, followed by measuring the amount of swelling that has taken place. Further, as stated above, free formaldehyde emission out of the press is significantly lower with the inventive resin system than with conventional fast-curing phenol-formaldehyde resins.

The foregoing detailed description is given for clearness of understanding only, and no unnecessary limitations should be understood therefrom, as modifications within the scope of the invention will be apparent to those skilled in the art.

I claim:

1. A method for the preparation of a modified phenol-aldehyde resole resin, comprising:

(a) reacting a phenolic compound and an aldehyde at a molar ratio of aldehyde to phenolic compound of about 1.2:1 to about 2.0:1, said reaction taking place in the presence of an alkaline catalyst present in an amount of about 0.1 to about 0.2 moles catalyst per mole of said phenolic compound; and (b) reacting a dihydroxybenzene modifier with the product of step (a) wherein (1) the molar ratio of said phenolic compound to said modifier is about 1:1 to about 10:1 and (2) the molar ratio of said aldehyde to the total of said phenolic compound and said modifier is greater than about 1:1.

2. The method of claim 1 wherein said aldehyde comprises formaldehyde.

3. The method of claim 1 wherein:

said modifier comprises resorcinol.

4. The method of claim 1 wherein:

said molar ratio of said aldehyde to the total of said phenolic compound and said modifier is about 1:1 to about 1.8:1.

5. The method of claim 4 wherein:

said molar ratio of said aldehyde to the total of said phenolic compound and said modifier is about 1:1 to about 1.4:1.

6. The method of claim 5 wherein:

said molar ratio of said aldehyde to the total of said phenolic compound and said modifier is about 1.2.

7. The method of claim 1 wherein:

said molar ratio of aldehyde to said phenolic compound is about 1.3:1 to about 1.6:1.

8. The method of claim 7 wherein:

said molar ratio of aldehyde to said phenolic compound is about 1.4:1.

9. The method of claim 1 wherein:

said molar ratio of said phenolic compound to said modifier is about 5:1 to about 10:1.

10. A resin made by the method of any one of claims 1–9 or 42–44.

11. The method of claim 1, and further comprising:

heating the product of step (a) to a temperature greater than about 70° C. prior to step (b).

12. The method of claim 1, and further comprising:

heating the product of step (a) to a temperature greater than about 85° C. prior to step (b).

13. The method of claim 1, and further comprising:

heating the product of step (a) to a temperature greater than about 90° C. prior to step (b).

* * * * *